United States Patent [19]

Lewis et al.

[11] 4,410,650

[45] Oct. 18, 1983

[54] LIGHT-STABLE POLYOLEFINS

[75] Inventors: Elyse M. Lewis, Williamstown, W. Va.; Leo L. Valdiserri, Belpre, Ohio

[73] Assignee: Borg-Warner Chemicals, Inc., Parkersburg, W. Va.

[21] Appl. No.: 406,737

[22] Filed: Aug. 9, 1982

[51] Int. Cl.$^3$ ................................................. C08K 5/53
[52] U.S. Cl. .................... 524/119; 524/101; 524/204; 524/336; 524/400; 524/125
[58] Field of Search ................................. 524/117, 119

[56] References Cited

U.S. PATENT DOCUMENTS

| | | |
|---|---|---|
| 3,155,703 | 11/1964 | Emmons et al. ............... 524/119 |
| 3,647,841 | 3/1972 | Kauder ............................ 524/119 |
| 3,661,843 | 5/1972 | Hechenbleikner et al. ..... 524/119 |
| 3,873,498 | 3/1975 | Brunetti .......................... 524/119 |
| 3,959,220 | 5/1976 | Hechenbleikner et al. ..... 524/119 |
| 4,012,399 | 3/1977 | Hechenbleikner et al. ..... 524/119 |
| 4,118,352 | 10/1978 | Haberlein et al. .............. 524/119 |
| 4,276,195 | 6/1981 | Verkada ....................... 252/431 P |

*Primary Examiner*—John Kight, III
*Assistant Examiner*—R. A. White
*Attorney, Agent, or Firm*—Joseph Shekleton

[57] ABSTRACT

An olefin polymer composition containing an ultraviolet light stabilizer. The ultraviolet light stabilizer is a zerovalent nickel complex the organic portion of which is an ester of pentaerythritol phosphite.

8 Claims, No Drawings

LIGHT-STABLE POLYOLEFINS

This invention relates to an improved polymer composition. More particularly, it relates to olefin polymer compositions which are stabilized by the presence of certain zerovalent nickel complexes.

BACKGROUND OF THE INVENTION

In recent years olefin polymers have found extensive use in the preparation of a wide variety of products such as fibers, bottles, films, etc. It is well known that exposure to sunlight or other sources of ultraviolet light cause the degradation of olefin polymers. Such degradation is shown by a loss in the molecular weight of the polymer, by the development of color, and by a decrease in such physical properties as tensile strength to the point of mechanical failure. This type of degradation has in the past been dealt with by the incorporation in the polymer composition of certain additives which are effective to inhibit it.

Certain organic nickel complexes are known to be effective ultraviolet stabilizing agents because, it is believed, they tend to inactivate excited molecular species which otherwise would cause chain scission and degradation of the polymer molecule.

In general, nickel compounds exist as one of three geometric configurations, square planar, tetrahedral (where nickel has a coordination number of 4), or octahedral (where nickel has a coordination number of 6). The latter is the most common. The organic nickel complexes here are believed to have a tetrahedral structure inasmuch as they are derivable from nickel carbonyl which is known to have a tetrahedral structure.

U.S. Pat. No. 3,661,843 (Hechenbleikner et al.), for example, shows the utilization as stabilizers of organic solid polymer materials of a wide variety of organic nickel complexes which contain phosphorus. One of the organic nickel complexes shown, at column 16, lines 8-13, is characterized by the structural formula

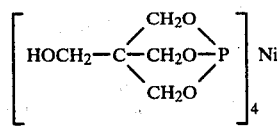

It apparently was prepared by the reaction of nickel carbonyl and pentaerythritol phosphite.

U.S. Pat. No. 3,959,220 (Hechenbleikner et al.) and U.S. Pat. No. 4,012,399 (Hechenbleikner et al.) have the same disclosure as that of the above Hechenbleikner et al. patent.

U.S. Pat. No. 4,276,195 shows the reaction of a normally homogeneous transition metal catalyst, such as tetrakis trimethylphosphite nickel(0), with a polydentate ligand such as dimethyl pentaerythritol diphosphite. The product is a polymeric solid which is an effective catalyst in the isomerization of olefins.

SUMMARY OF THE INVENTION

The invention here is a polymer composition comprising an olefin polymer and a minor proportion, sufficient to inhibit deterioration of said olefin polymer ordinarily resulting from exposure to ultraviolet light, of a zerovalent nickel complex having the structural formula

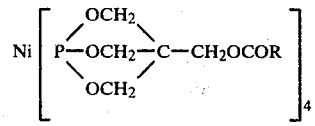

where R is alkyl of 1-8 carbon atoms, phenyl, alkylphenyl, hydroxyphenyl or

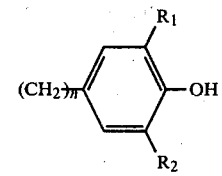

where $R_1$ and $R_2$ are lower alkyl, and n is 0-2.

DESCRIPTION OF THE PREFERRED EMBODIMENTS

The alkyl groups ($R_1$ and $R_2$) in the above structural formula are lower alkyl groups. A "lower alkyl" group, for purposes of this invention, is one having 1-6 carbon atoms. Preferably, these lower alkyl groups should be bulky groups, i.e., either secondary or tertiary alkyl groups such as isopropyl, sec-butyl, tertiarybutyl, n-amyl, tertiaryamyl, 2,2-dimethylbutyl and 2-methyl-2-ethylpropyl. Particularly preferred are those organic nickel complexes of these types where the alkyl groups are tertiarybutyl.

R, as indicated, may be an alkyl group of 1-18 carbon atoms. It may be either straight chain or branched chain. Methyl, ethyl, isopropyl, isobutyl, n-hexyl, n-octyl, n-decyl, isododecyl and octadecyl are illustrative. R may also be alkylphenyl in which case the alkyl group preferably contains 1-6 carbon atoms.

The organic nickel complexes of the invention are prepared by an exchange reaction between the nickel-trimethyl phosphite complex of the structure

Ni [P(OCH$_3$)$_3$]$_4$ and the appropriate pentaerythritol phosphite. The exchange reaction proceeds very simply, merely upon mixing the two reactants and heating the mixture, usually at reduced pressure to permit easy removal of displaced trimethyl phosphite by distillation. When no more trimethyl phosphite distills the reaction is finished. The residue is the product. It may be purified by washing with a solvent such as heptane or acetone. No catalyst is required; a solvent, e.g., toluene, may be used. The temperature of the reaction may range from slightly above room temperature, e.g., 40° C. to as high as 150° C.

The nickel-trimethyl phosphite reactant may be prepared by mixing nickel chloride (NiCl$_2$) and trimethyl phosphite in the presence of an alkaline material such as sodium carbonate, and methanol. The reaction proceeds according to the following equation:

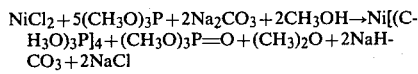

NiCl$_2$+5(CH$_3$O)$_3$P+2Na$_2$CO$_3$+2CH$_3$OH→Ni[(C-H$_3$O)$_3$P]$_4$+(CH$_3$O)$_3$P=O+(CH$_3$)$_2$O+2NaH-CO$_3$+2NaCl

The nickel-trimethyl phosphite complex is a solid, crystallizable from hexane.

Olefin polymers that can be stabilized with compositions comprising a zerovalent nickel complex according to this invention include alpha olefin polymers such as polyethylene, polypropylene, polybutene, poly-3-methylbutene, or copolymers thereof such as ethylene vinyl acetate copolymer and ethylene propylene copolymer, polybutadiene, polyisoprene, polystyrene, poly(vinyl acetate), copolymers of styrene and another monomer (for example, maleic anhydride, butadiene, acrylonitrile, etc.), acrylonitrile-butadiene-styrene copolymer, acrylic acid ester-butadiene-styrene copolymer, methacrylic acid ester-butadiene-styrene copolymer, methacrylate ester resin such as poly(methylmethacrylate), poly(vinylalcohol), etc.

The following examples show the preparation of the nickel-trimethyl phosphite and its use in the preparation of the zerovalent nickel complexes of the invention.

EXAMPLE 1

To a stirred mixture of 310 g. (2.5 mol) of trimethyl phosphite, 106 g. (1.0 mol) of sodium carbonate and 200 ml. of methanol there is added portionwise, over a period of 90 minutes, a solution of 64.5 g. (0.50 mol) of nickel chloride in 200 ml. of methanol. A slightly exothermic reaction ensues causing the temperature to rise to 35° C. Stirring is continued until the mixture is colorless whereupon the product mixture is heated at reflux temperature for two hours, then cooled and filtered. The filtrate is concentrated by evaporation at reduced pressure and the residue (tetrakis trimethylphosphite nickel(0)) is crystallized from n-heptane. Yield: 80% of a white, crystalline solid; M.P., 115°–118° C.

EXAMPLE 2

A mixture of 7.2 g. (0.013 mol) of tetrakis trimethylphosphite nickel(0) and 22.9 g. (0.054 mol) of the ester of pentaerythritol phosphite and 3-(3',5'-ditertiarybutyl-4'-hydroxyphenyl) propionic acid is heated with stirring, over a period of one hour, to 170° C. /22 mm.. During this period trimethylphosphite is collected as a distillate. The green, glassy residue weighs 25.2 g., M.P., 85°–100° C.

EXAMPLE 3

A solution of 8.3 g. (0.015 mol) of tetrakis trimethylphosphite nickel(0) and 244 g. (0.062 mol) of the ester of pentaerythritol phosphite and 3,5-ditertiarybutyl-4-hydroxybenzoic acid in 20 ml. of toluene is heated with stirring to 150° C./25 mm. The residue is crystallized from a 60/40 mixture of heptane and toluene. The yield of light yellow crystalline solid, M.P., 215°–220° C., is 20.6 g. (83.7% of the theory).

EXAMPLE 4

A mixture of 12.2 g. (0.022 mol) of tetrakis trimethylphosphite nickel(0) and 24.4 g. (0.091 mol) of the ester of pentaerythritol phosphite and benzoic acid is heated with stirring to 150° C./22 mm. and held at these conditions for 45 minutes. The residue is washed with toluene, then freed of last traces of the toluene by heating to 80° C./20 mm. The yield of white solid is 21.3 g.

EXAMPLE 5

A mixture of 11.65 g. (0.021) of tetrakis trimethylphosphite nickel(0) and 25 g. (0.088 mol) of the ester of pentaerythritol phosphite and salicylic acid is heated to 165° C./20 mm., then held at 100° C./20 mm. for 60 minutes. The residue is washed with toluene and dried. The yield of white solid is 23 g., M.P., 250° C. (with decomposition).

EXAMPLE 6

A mixture of 27.7 g. (0.05 mol) of tetrakis trimethylphosphite nickel(0), 41.2 g. (0.20 mol) of the acetate of pentaerythritol phosphite and 200 ml. of o-dichlorobenzene is heated with stirring to (30° C./140 mm. A total of 30 ml. of trimethylphosphite is collected as a distillate. The residue is cooled, diluted with heptane, filtered, and the solid dried and washed with heptane and dried.

EXAMPLE 7

A mixture of 12.5 g. (0.023 mol) of tetrakis trimethyl phosphite nickel(0) and 30.1 g. (0.095 mol) of the n-decanoate of pentaerythritol phosphite is heated with stirring to 165° C./20 mm. The vacuum is broken with nitrogen. The residue in the reaction flask weighs 31.3 g. It is warmed in 70 ml. of toluene to 70° C. and filtered. The cooled filtrate deposits crystals which are recrystallized from acetonitrile to yield 21.5 g. of a colorless solid, M.P., 245°–254° C. (dec.).

The efficacy of the organic nickel complexes of this invention as polymer stabilizers is shown by the test data set out in Table I. The data is obtained from atmospheric tests carried out in Puerto Rico. Test samples are in the form of 200/16 denier polypropylene multifilaments consisting of polypropylene, 0.05 phr (parts per hundred parts of resin) of calcium stearate, 0.15 phr of tris-(3,5-ditertiarybutyl-4-hydroxybenzyl)isocyanurate and the indicated amounts of nickel complex and 531, a known UV absorber commonly used to enhance the UV inhibiting activity of nickel compounds. The tensile strength of each sample is determined before the test is begun and at periodic intervals thereafter during exposure to the atmosphere. The degree of such exposure (in terms of kilolangleys) required to reduce the tensile strength to one half its original value is taken as the point of failure of the sample. The amounts of Ni complexes are expressed in terms of weight as nickel.

TABLE I

| | Kilolangleys of Exposure Required to Reach 50% of Original Tensile Strength | | | | | |
|---|---|---|---|---|---|---|
| | Amounts | | | | | |
| Ni Complex | 1 | 2 | 3 | 4 | 5 | 6 |
| 1084[a] | 0.5 | | | 0.25 | | |
| Product of Ex 6 | | 0.5 | | | 0.25 | |
| Product of Ex 2 | | | 0.5 | | | 0.25 |
| 531[b] | | | | 0.25 | 0.25 | 0.25 |
| Kilolangleys | 40 | 54 | 40 | 49 | 102 | 82 |

[a]2,2'-thiobis-(4-tertiaryoctylphenolate)n-butylamine nickel II
[b]4-Octoxy-2-hydroxybenzophenone Test sample 1084 is a well-known and widely used nickel-containing ultraviolet light stabilizer.

Similar results, obtained from the same type of test, are shown in Table II where the test samples contain slightly less of the tris-(3,5-ditertiarybutyl-4-hydroxybenzyl)isocyanurate component, i.e., 0.10 phr. These test samples also contain 0.05 phr of calcium stearate plus the indicated amounts of nickel compounds, expressed in terms of weight as nickel.

TABLE II

Kilolangleys of Exposure Required to Reach 50% of Original Tensile Strength

| Ni Compound Amount (phr) | 1084 | 2002[c] | Prod. of Ex. 6 | Prod. of Ex. 2 | 531 | Kilo-langleys |
|---|---|---|---|---|---|---|
| 1 | 0.25 | | | | | 51 |
| 2 | | 0.25 | | | | 58 |
| 3 | | | 0.25 | | | 66 |
| 4 | 0.50 | | | | | 36 |
| 5 | | 0.50 | | | | 56 |
| 6 | 0.25 | | | | 0.25 | 60 |
| 7 | | 0.25 | | | 0.25 | 84 |
| 8 | | | 0.25 | | 0.25 | >104 |
| 9 | | | | 0.25 | 0.25 | 80 |

[c]Nickel ethyl(3,5-ditertiarybutyl-4-hydroxybenzyl)phosphate

Decomposition of nickel-containing stabilizers at polypropylene processing temperatures is a common problem. The nickel complexes of this invention, when extruded and then subjected to severe molding conditions, cause less build-up in the feed section of the extruder screw than do 1084 and 2002, for example.

The zerovalent nickel complex of pentaerythritol phosphite, shown in U.S. Pat. No. 3,661,843 (Hechenbleikner et al.) is rated 60 in the above Exposure Test, when tested at a concentration of 0.50 phr. This rating is comparable with that for Sample No. 3 in Table II which, it will be noted, is tested at a concentration of 0.25 phr. That is, the zerovalent nickel complex of this invention is better than the zerovalent nickel complex of the prior art, even when tested at one half the concentration.

The polymer compositions herein may contain other additives in addition to the zerovalent nickel complexes. They may contain metal carboxylates such as calcium stearate, magnesium stearate, zinc laurate and the like, and metal oxides such as magnesium oxide and zinc oxide. Other additives may also be present including antistatic agents, slip agents, UV stabilizers, fillers, pigments, etc.

All parts and percentages herein, unless otherwise expressly stated, are by weight.

We claim:

1. A polymer composition comprising an olefin polymer and a minor proportion, sufficient to inhibit deterioration of said olefin polymer ordinarily resulting from exposure to ultraviolet light, of a zerovalent nickel complex having the structural formula

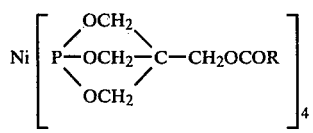

where R is alkyl of 1–18 carbon atoms, phenyl, alkylphenyl, hydroxyphenyl, or

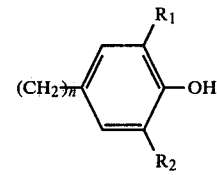

where $R_1$ and $R_2$ are lower alkyl, and n is 0–2.

2. The polymer composition of claim 1 wherein the olefin polymer is a propylene polymer.

3. The polymer composition of claim 1 wherein the olefin polymer is polypropylene.

4. The polymer composition of claim 1 wherein the zerovalent nickel complex is one in which R in the structural formula is lower alkyl.

5. The polymer composition of claim 1 wherein the zerovalent nickel complex is one in which R in the structural formula is 2-(3',5'-dialkyl-4'-hydroxyphenyl)ethyl.

6. The polymer composition of claim 1 wherein the zerovalent nickel complex is one in which R in the structural formula is 3,5-dialkyl-4-hydroxyphenyl.

7. The polymer composition of claim 1 wherein the zerovalent nickel complex is one in which R in the structural formula is 2-hydroxyphenyl.

8. The polymer composition of claim 1 wherein the zerovalent nickel complex is one in which R in the structural formula is phenyl or alkylphenyl.

* * * * *